Aug. 30, 1966
E. R. SANDMEYER
3,269,533
SORTING METHOD AND APPARATUS UTILIZING
TRIANGULAR OPENINGS
Filed Nov. 1, 1963
4 Sheets-Sheet 1
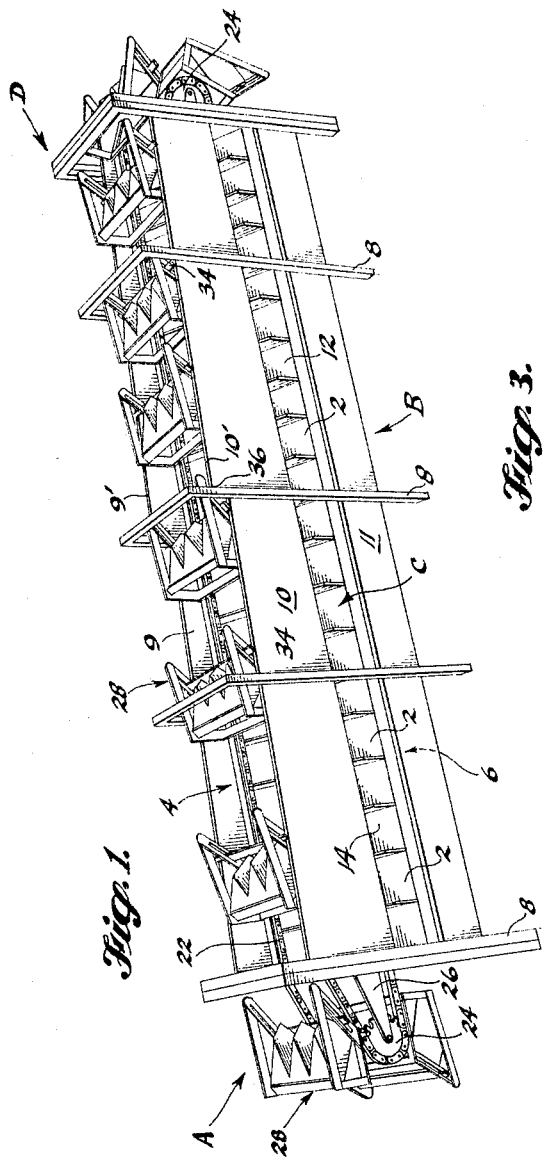
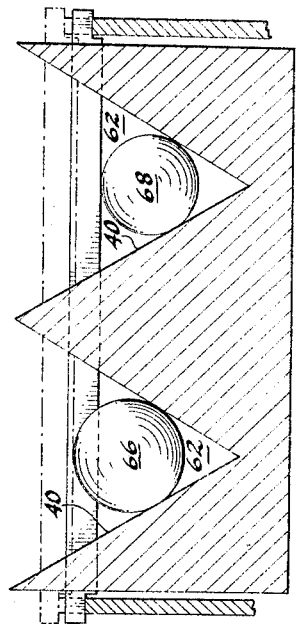
INVENTOR.
ERNEST R. SANDMEYER
BY Reynolds and
Christensen
ATTORNEYS Aug. 30, 1966
E. R. SANDMEYER
3,269,533
SORTING METHOD AND APPARATUS UTILIZING
TRIANGULAR OPENINGS
Filed Nov. 1, 1963
4 Sheets-Sheet 2
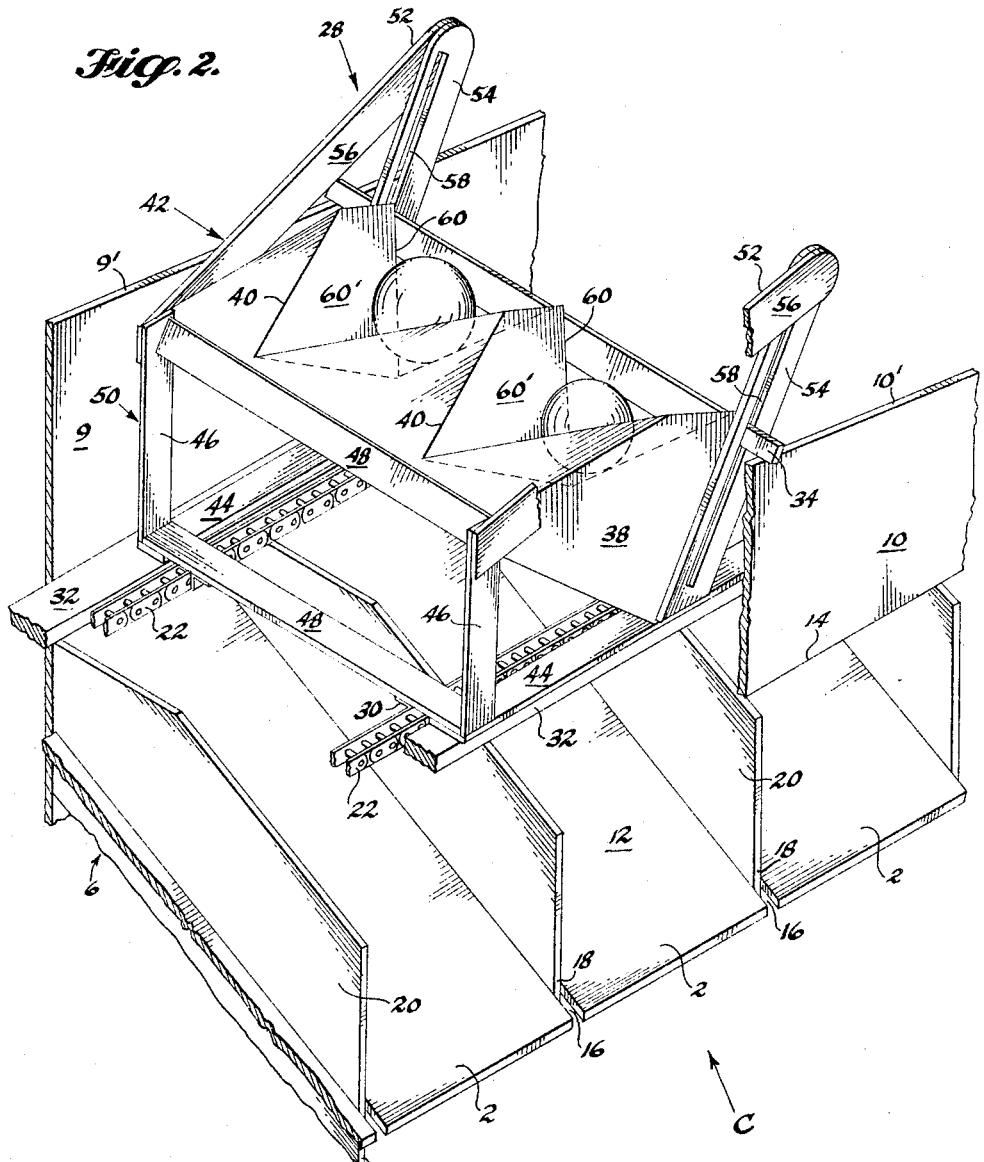
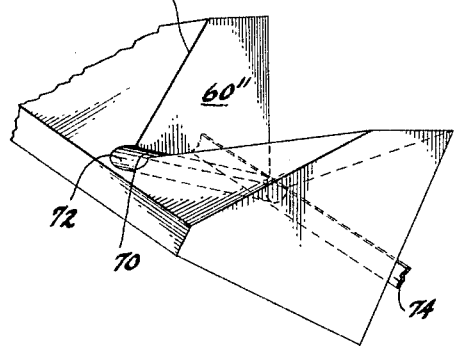
INVENTOR.
ERNEST R. SANDMEYER
BY Reynolds and
Christensen
ATTORNEYS Aug. 30, 1966 — E. R. SANDMEYER — 3,269,533
SORTING METHOD AND APPARATUS UTILIZING TRIANGULAR OPENINGS
Filed Nov. 1, 1963 — 4 Sheets-Sheet 3
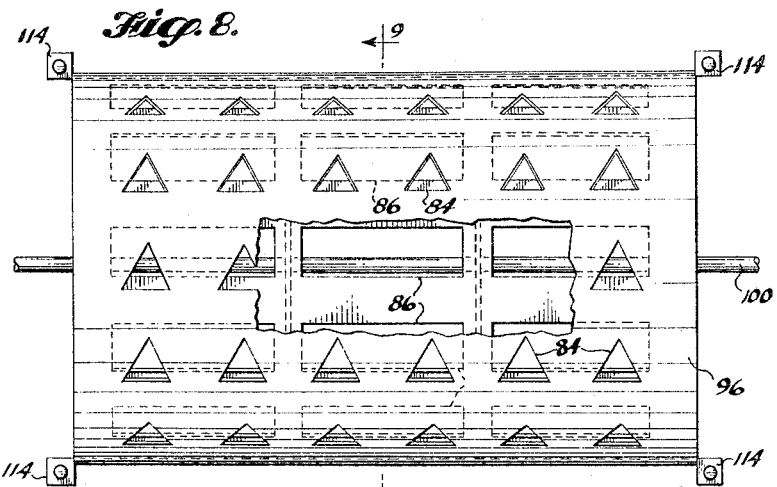
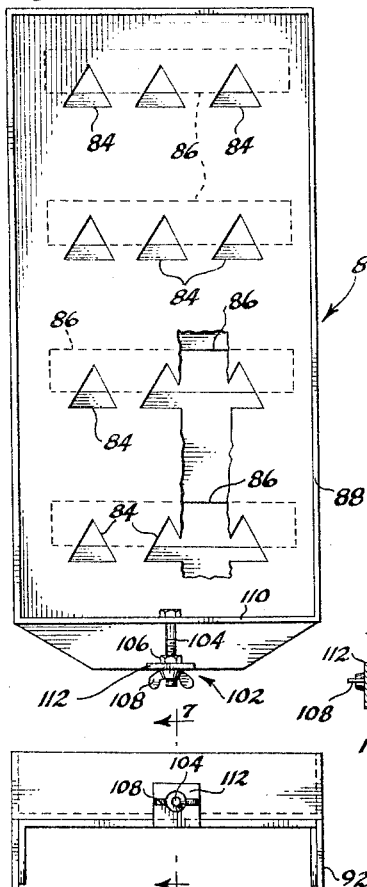
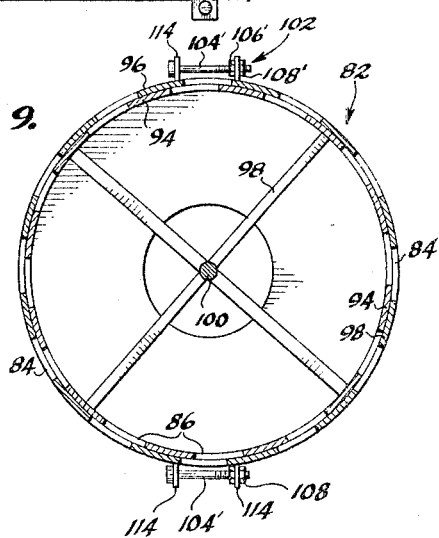
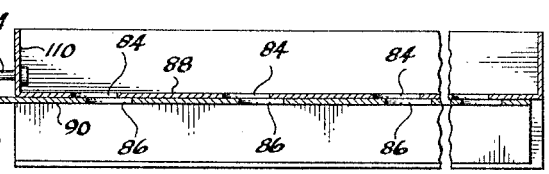
INVENTOR.
ERNEST R. SANDMEYER
BY Reynolds and Christensen
ATTORNEYS Aug. 30, 1966  E. R. SANDMEYER  3,269,533
SORTING METHOD AND APPARATUS UTILIZING
TRIANGULAR OPENINGS
Filed Nov. 1, 1963  4 Sheets-Sheet 4
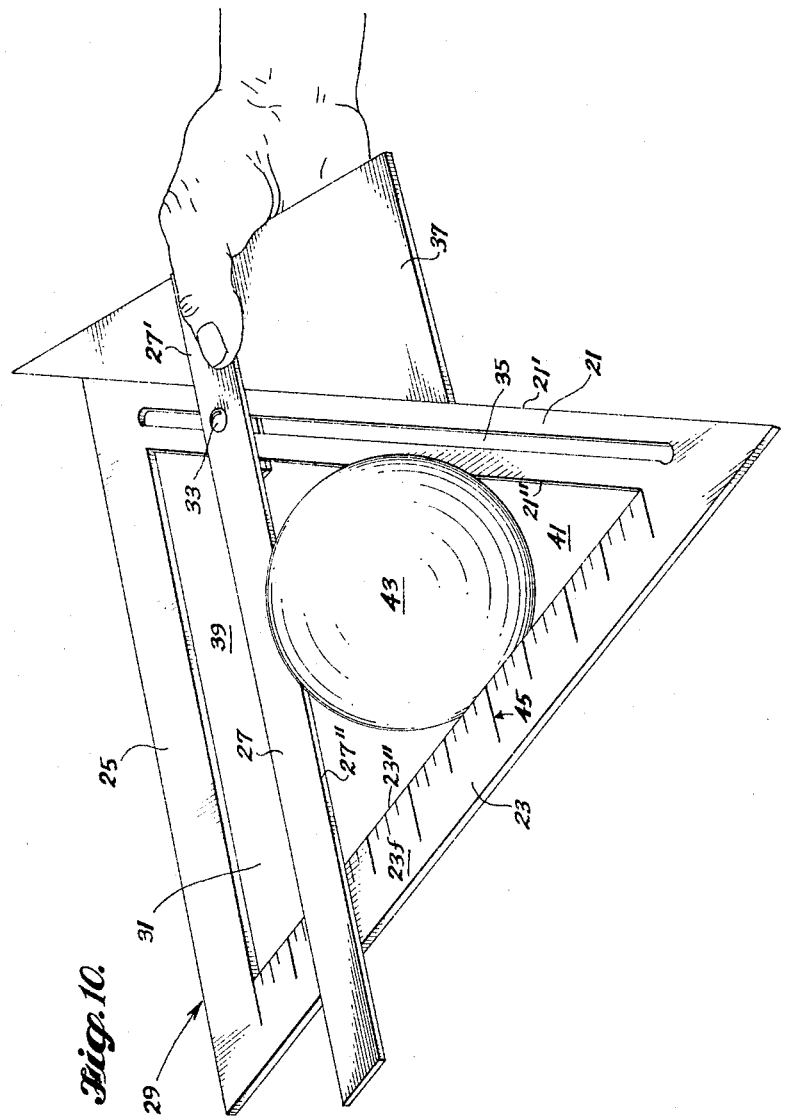
INVENTOR.
ERNEST R. SANDMEYER
BY
Reynolds and
Christensen
ATTORNEYS

United States Patent Office 3,269,533
Patented August 30, 1966

---

3,269,533
SORTING METHOD AND APPARATUS UTILIZING TRIANGULAR OPENINGS
Ernest R. Sandmeyer, 101 Park Ave., Yakima, Wash.
Filed Nov. 1, 1963, Ser. No. 320,701
14 Claims. (Cl. 209—83)

This invention relates to sorting devices for sorting out an article of a particular size from among articles of diverse sizes having the same or a dissimilar description. Such devices have particular utility in the sorting of fruits and vegetables. However, the term "article" as used herein is intended to refer to any two or three dimensional items whose size can be estimated by comparison with an opening having known dimensions. Examples of other articles, as the term is used herein, include eggs, construction gravel, marbles, lead-shot, beads, pearls and other precious stones, tulip bulbs, and seeds.

In the fruit and vegetable processing industry and in the processing industries concerned with the other articles mentioned above, many and various kinds of sorting devices have been known and used for years. The operating personnel sorting and inspecting fruit in the fruit processing industry, for example, carry sets of hand-operated wire rings, plastic cards, or the like which are equipped with round openings that operate to receive the individual pieces of fruit from the operator and to approximate their size for him by whether the fruit will pass through a particular opening or not. Additionally, batches of apples and other fruits are commonly sorted as to size by placing them on a moving conveyor having round openings therein which are adapted initially to receive the fruit without passing the same and thence as travel of the conveyor progresses, to release the individual pieces of fruit in accordance with their size. So long as the fruit approximates a sphere, these round-opening devices provide a reasonably satisfactory means of sorting and sizing the fruit, but where there is any substantial departure from a sphere in the shape of the fruit, they are incapable of appropriately sorting the fruit without substantial extrapolation by the operator.

It is a principal object of the present invention to provide a sorting device which is not limited in its usefulness to the sorting out of spherical or near-spherical articles. It is also a principal object of my invention to provide a sorting device which, in addition to the above feature, also has an adjustable opening that can be either hand-manipulated or machine-manipulated. Other objects include the provision of certain novel sorting machines which incorporate a device having these features and advantages.

Heretofore all sorting devices have employed round, slotted, square or similarly characterized openings having relatively opposing edges. At the inception of my invention I came to appreciate that any article which does not approximate a sphere and which is sorted by its ability to pass through a round or otherwise bisymmetrical or radiosymmetrical opening, is in fact sorted in terms of a single diameter of the article. This follows from the fact that the article, due to its aspherical shape, makes contact with the edges of the opening at only two diametrically opposed points, much as a four-legged stool rests on an irregular floor in a tetering posture about a line extending between two of its diametrically opposing legs. Consequently, the article is sorted only in terms of the diameter common to its two points of contact. In the case of an oblong article this may very well be its longest diameter or dimension, and thus the estimation of size obtained from it may be deceptive of the characteristic bulk and form of the article.

According to my invention, this problem can be overcome by providing a sorting device having means which define an opening bounded at least in part by three straight elongated edges which coincide with the sides of a substantially equilateral triangle and which approach the vertices of the triangle to such an extent that the distances between mutually adjacent ends of the edges are less than the smallest dimension across the article to be sorted out. Articles introduced into a monosymmetrical opening of this nature must make contact with all three-edges of the opening and consequently they are sorted in terms of an average of three radii which do not lie on a common diameter. They cannot rest on less than three edges of the opening any more than a three-legged stool can balance on two of its legs on an irregular floor. Moreover, if the means is adjustable to vary the area of the opening by relative movement in the plane of the triangle between at least one of the edges and the other two of the edges in directions normal to said one edge, it is evident that the articles can be sorted according to size without disturbing the equilaterally triangular character of the opening.

The features and advantages of my invention will become apparent from the more detailed description following in which I illustrate certain embodiments of the invention with reference to the accompanying drawings wherein:

FIGURE 1 is a view in perspective of a sorting machine the carrier units of which employ my new form of sorting device;

FIGURE 2 is a closer view of one of the carrier units as it appears in the machine with a complement of articles on board and with certain portions of the machine removed to more clearly illustrate the unit;

FIGURE 3 (Sheet 1 of drawings) is a cross-sectional view through the body of the carrier unit showing the release mechanism for the articles;

FIGURE 4 (Sheet 2 of drawings) is a partial perspective of a slightly modified carrier unit equipped with clean-out troughs;

FIGURE 5 is a plan view of a different form of sorting machine; FIGURE 6 is a front elevational view of the same; FIGURE 7 is a longitudinal cross section of the same;

FIGURES 8 and 9 are elevational and cross-sectional views, respectively, of a third form of sorting machine, the cross-sectional view of FIGURE 9 being taken along the line 9—9 of FIGURE 8; and FIGURE 10 (Sheet 4 of drawings) is a view in perspective of a sorting frame constituting a hand-operated version of my device.

Referring first to the sorting frame illustrated in FIGURE 10, it will be seen that it is fashioned from four flat bars 21, 23, 25, and 27; three 21, 23, and 25 of which are arranged and joined in an open-faced triangular frame 29, and the fourth 27 of which is superimposed on the frame as a crossbar laid athwart its opening 31. The crossbar 27 is slidably engaged on the frame by means of a screw 33 which is attached to the crossbar and passed through an elongated slot 35 running along the length of one 21 of the framing bars in coextensive relationship with the opening 31. A nut (not shown) which is threaded on the end of the shank of the screw 33 prevents its release from the slot 35. The crossbar 27 is also under the guidance of a control block 37 which is secured on one 27' of its outlying ends so as to be in sliding contact with the adjacent exterior edge 21' of the framing bar 21. The block 37 also serves as a grip for the manipulation of the crossbar with respect to the frame, the relative adjustment of the two acting to move the crossbar in directions normal to its longitudinal edge 27''.

The transverse disposition of the crossbar 27 over the opening 31 operates to divide the latter into two sectional openings 39 and 41, one 41 of which remains triangular in character. In accord with the invention, the triangular sectional opening 41 is designed to be equilateral by virtue of the crossbar 27 being disposed at 60° angles with respect to each of the interior edges 21" and 23" of the framing bars 21 and 23 to correspond with a 60° angle built into the frame at the intersection of these bars. Consequently, an article 43 placed in the sectional opening 41 must make contact with three edges 21", 23", and 27" and be graded in terms of three radii of the article, no two of which be in a common diameter. Moreover, as the crossbar is adjusted to increase the area of the sectional opening 41, the latter remains equilaterally triangular in character and the article continues to be graded in terms of three of its nonparallel radii. Ultimately, the opening 41 becomes oversized for the article and it tumbles through it. This condition is measurable in standard units forming a scale 45 imprinted on the face 23f of one 23 of the unslotted legs.

Referring next to the form of sorting machine illustrated in FIGURES 1 through 4, it will be seen that it is essentially an endless chain conveyor A mounted on a rack B equipped with a gallery C of collection trays or hoppers 2 which are inclined to the horizontal so as to discharge out of one side of the rack. The latter is characterized with an open-ended cradle 4 having the gallery of hoppers 2 along its bottom. Travel of the conveyor is from right to left in the cradle, and thence under the cradle from left to right through a tunnel 6 provided along the underside of the rack.

The rack B is constructed from a set of box or collar frames 8 arranged in tandem on common spacings to serve as a supporting frame D for several sheets 9 through 12 of heavy paneling which define the side walls and bottom of the cradle 4 and tunnel 6. Three 9 through 11 of the sheets are secured upright at the sides of the frame D, that 9 seen in the rear of FIGURE 1 forming a single continuous wall for the rack while those 10 and 11 in the front are separated by an opening 14 running the full length of the gallery C to allow for the discharge therefrom. The walls 9 and 11 are laced together by a fourth sheet 12 which extends across the bottom of the cradle and acts as the bed plate for the hoppers, there being slots 16 (FIGURE 2) transversely of it to receive the lug portions 18 of a series of baffle plates 20 which are rabbetted along their lower edges to so engage in the sheet 12.

The chain conveyor A is equipped with a pair of link chains 22 driven in parallel by sprockets 24 mounted on brackets 26 at the ends of the rack B. A train of carrier units 28 is engaged and supported on the chains, their engagement being effected by eyes 30 or other such means operating to grasp the links in the chains. During their passage through the cradle 4 the carrier units 28 ride over rails 32 secured along the insides of the cradle walls 9 and 10 in positions abreast of the chains 22. Both the chains and the rails follow horizontal courses in the cradle, there being rollers, sprockets or other such means (not shown) to guide them into the same. The carrier units 28 carry crossbars 34, however, which ride on separate courses defined by the upper edges 9' and 10' of the walls 9 and 10 for reasons which will be later explained. The edges 9' and 10' are similarly mitered at upward inclinations to the horizontal, from right to left, and are also stepped at one point 36 along their length.

Referring now in particular to FIGURE 2 for a description of the carrier units 28, it will be seen that each unit is essentially a block 38 having a pair of V-shaped notches 40 therein which are open to the top of the block and inclined at an acute angle to the horizontal by reason of the peculiar mounting of the block in a frame 42 for the unit. The latter takes the form of a sled having runners 44 spaced to slide over the rails 32 on the walls 9 and 10 of the cradle, and a superstructure thereon comprising a pair of studs 46 laced together by purlins 48 to form a shoulder frame 50 for a pair of stanchions 52.

The stanchions include spars 54 standing up on the runners 44 and held in inclined relation thereto by guys or struts 56 reaching out from the shoulder frame 50. Slots 58 extending longitudinally of the spars 54 serve to provide a slide course for the crossbar 34 mentioned earlier, the block 38 being mounted in such relation to the spars 54 that the slide course is coplanar with the adjacent mouth 60 of each notch 40. The walls 60' of each notch are separated by a substantially 60° angle. Consequently, the crossbar 34 operates to define a substantially equilaterally triangular opening 62 (FIGURE 3) across the mouth of each notch. During travel of the carrier unit 28 through the cradle 4, the courses followed by the upper edges 9' and 10' of the cradle walls 9 and 10 operate to slowly raise the crossbar 34 so that the openings 62 progressively enlarge, though still maintaining their equilaterally triangular character. Initially then, articles such as those seen at 66 and 68 make leaning contact with both the walls 60' and the crossbar 34. As travel progresses, first the smaller 68 and then the larger 66 is released under its own weight by the crossbar to tumble into one of the hoppers 2 below. Proper coordination between the spacings of successive hoppers and the degree of rise experienced by the crossbar between the hoppers, permits sorting of a mass of such articles into any desired number of graduations. When one loading of articles has been entirely sorted, a second can be introduced after the step 36 to begin a second cycle.

The carrier units 28 can be fed by hand, if necessary or desired. However, a wide choice of feed mechanisms are known which are operable with my aforedescribed device. For example, one uses a rotating wheel to receive the articles in recesses between spokes thereon and operates to rotate the wheel in synchronization with a sorting device of the character described, the articles being deposited on the device one by one from the wheel as it turns.

In use bins, moving belts or other such means are stationed alongside of the rack B to collect the articles discharged from each hopper. To enable more convenient illustration of the sorting device itself, however, these have been omitted from the drawings together with a motor by which to drive the chains and a particular feeder mechanism such as might be preferred for the device.

An inclination of 30°–50° is considered best for the notches 40. While it is necessary that the opening 62 across the mouth 60 of the notches be bounded by straight edges, as seen (although a slight serration or similar effect may be given to the edges if expedient), it is not necessary that the opening 62 be bounded entirely by these edges. For example, in FIGURE 4, the bottoms of the notches 40' open through a throat 70 into troughs 72 running below the notches to catch debris, water, and other matter draining off of or deposited in the notches with the articles. In such an instance, however, the walls 60" of the notches must approach their line of intersection to such an extent that the distance across the throat 70 is less than the smallest dimension across the articles to be sorted out. In the case of fruit, vegetables and the like, this dimension is adequately large to allow for a substantial throat width. A spring-biased crossbar 74 operates to retain the debris and other matter in the troughs until the carrier unit has reached the end of the rack or some other suitable point at which the crossbar 74 is tripped to allow the troughs 72 to discharge.

Reference should now be made to FIGURES 5 through 9 for illustrations of two other applications of the invention. Each involves what can be termed a different form of carrier unit, that seen in FIGURES 5 through 7 being in the form of a pan sieve 80 and that in FIGURES 8 and 9 in the form of a drum sieve 82. Each sieve has a pair of members making sliding contact with one another and having openings 84 and 86 which when overlapped define equilaterally triangular openings or ones which are substantially so. In the case of FIGURES 5 through 7, the relatively sliding members comprise a pan 88 and a slider plate 90 thereunder, the two being supported on legs 92 allowing for the sifted material to collect therebelow. In FIGURES 8 and 9, the members comprise concentric inner and outer drums 94 and 96, respectively. The inner drum 94 is mounted by spiders 98 on a shaft 100 and has the outer drum 96 closely enclosing it. Sliding action between the pan 88 and slider plate 90 is relatively longitudinally of the members, while between the drums 94 and 96 it is relatively angularly about the shaft 100. The action is controlled in each instance by a turnbuckle arrangement 102 comprised of the combination of a machine screw 104, jamb nut 106, and wing nut 108 operating between the forward wall 110 of the pan 88 and an upstanding flange 112 on the slider plate 90, in the case of FIGURES 5 through 7; and a comparable combination 104', 106', and 108' operating between lugs 114 outstanding from the ends of the drums in the case of FIGURES 8 and 9. Either of these embodiments is particularly suited to the sorting of mass articles such as peas, cherries, gravel, and the like.

The term "substantially" is used in connection with the character of the opening herein, to indicate that a small departure from a purely equilateral triangle, such as 5°, is possible in the case of the sizing openings of all three embodiments. However, it is not to be construed to include openings of a different kind, such as openings of four, five, or a larger number of edges. The drawbacks of a four-edged opening have been discussed. It has also been found that five-edged and larger openings suffer from much the same drawbacks since they again approach a condition in which there are relatively opposing sides conferring a bisymmetrical or near-bisymmetrical character on the opening in question. Like the square or circular opening, then, they too are prone to measure only in terms of a single diameter, particularly where the article in question has a poor weight distribution.

Many other modifications and additions are also possible without departing from the spirit of the invention as defined in the claims following.

I claim as my invention:

1. In a sorting device for sorting out an article of a particular size from among articles of diverse sizes having the same or a dissimilar description, a movable carrier unit for the article having means operatively defining a downwardly facing opening which is bounded at least in part by three straight edges which coincide with the sides of a substantially equilateral triangle and which approach the vertices of the triangle to such an extent that the distances between mutually adjacent ends of the edges are less than the smallest dimension across the article to be sorted out, said means being adjustable to vary the area of the opening by relative movement in the plane of the triangle between at least one of the edges and the other two of the edges in directions normal to said one edge.

2. A sorting device according to claim 1 further comprising control means operative to cause the aforesaid relative movement between the edges of the opening.

3. A sorting device according to claim 2 wherein the carrier unit is mounted to travel over a substantially horizontal course.

4. A sorting device according to claim 3 wherein the control means is operative to effect a gradual enlargement in the area of the opening as travel of the unit progresses.

5. A sorting device according to claim 4 wherein the control means is also intermittently operative to effect a quick reduction in the area of the opening at spaced intervals along the course of the unit's travel.

6. A sorting device according to claim 2 wherein the carrier unit is mounted to turn about a horizontal line therethrough.

7. A sorting device according to claim 2 wherein the carrier unit is reciprocably movable in a substantially horizontal plane.

8. A sorting device for sorting out an article of a particular size from among articles of diverse sizes having the same or a dissimilar description, comprising a rack, a conveyor mounted to travel over a substantially horizontal operational course on the rack, said conveyor being equipped with a carrier unit for the articles, said carrier unit having means operatively defining a downwardly-facing opening which is bounded at least in part by three straight edges which coincide with the sides of a substantially equilateral triangle and which approach the vertices of the triangle to such an extent that the distances between mutually adjacent ends of the edges are less than the smallest dimension across the article to be sorted out, said means being adjustable to vary the area of the opening by relative movement in the plane of the triangle between at least one of the edges and the other two of the edges in directions normal to said one edge, and means operative during the travel of the conveyor to cause the aforesaid relative movement between the edges of the opening in the direction normal to said one edge which is adapted to enlarge the area of the opening.

9. A sorting device according to claim 8 further comprising means operative at spaced intervals along the course of the conveyor's travel to cause the aforesaid relative movement between the edges of the opening in the direction normal to said one edge which is adapted to reduce the area of the opening.

10. A sorting device according to claim 8 wherein the carrier unit is equipped with a block having a plurality of V-shaped 60° notches therein which are open to the top of the block and inclined at an acute angle to the horizontal, and is further equipped with a crossbar mounted in a slide course which is coplanar with the lower mouth of each notch, said rack having upwardly inclined surfaces thereon over which the crossbar rides in the direction of conveyor travel, said surfaces being similarly mitered from a common horizontal so that the crossbar operates to define a substantially equilaterally triangular opening across the aforesaid lower mouth of each notch, the area of which opening progressively enlarges as the conveyor undergoes its travel.

11. A sorting device according to claim 10 wherein the inclined rack surfaces are stepped at spaced intervals along the course of the conveyor's travel.

12. A sorting device according to claim 10 wherein the block also has a trough which is inclined at an acute angle to the horizontal under each notch and which is joined with the bottom of the notch by a throat having a width of less than the smallest dimension across the article to be sorted out, and the carrier unit is still further equipped with a second crossbar operatively disposed across the lower mouth of the trough.

13. A method of sorting one size of article from another within a particular class of articles, comprising the steps of inserting each article into an opening which is bounded at least in part by three straight elongated edges which coincide with the sides of a substantially equilateral triangle and which approach the vertices of the triangle to such an extent that the distances between mutually adjacent ends of the edges are less than the smallest dimension common to the articles in that class, the whole of said opening within the edges being free of obstruction so that each article may be tested for size on the basis of whether it substantially passes through the opening or not, and segregating those articles which do pass substantially through the opening from those which do not.

14. A method according to claim 13 further comprising the step of adjusting the area of the opening until articles of a different size will pass through the same.

References Cited by the Examiner
UNITED STATES PATENTS

| | | | |
|---|---|---|---|
| 426,589 | 4/1890 | Johnson et al. | 209—398 |
| 601,897 | 4/1898 | Michon | 209—86 |
| 1,013,092 | 12/1911 | Murray | 209—84 |
| 1,146,102 | 7/1915 | Rogge | 209—84 |
| 1,345,858 | 7/1920 | Jenkins | 209—85 |
| 1,447,454 | 3/1923 | Williams. | |
| 1,504,683 | 8/1924 | Fusco. | |
| 2,201,083 | 5/1940 | Evenson | 209—398 |
| 2,720,706 | 10/1955 | Laine. | |
| 3,173,211 | 3/1965 | Williams. | |
| 3,193,157 | 7/1965 | Einhorn | 222—485 X |

M. HENSON WOOD, JR., *Primary Examiner.*

ROBERT B. REEVES, *Examiner.*

A. N. KNOWLES, *Assistant Examiner.*